United States Patent
Völcker et al.

(10) Patent No.: US 12,323,459 B2
(45) Date of Patent: Jun. 3, 2025

(54) VIDEO REPLAY ATTACK DETECTION

(71) Applicant: Axis AB, Lund (SE)

(72) Inventors: Björn Völcker, Lund (SE); Stefan Lundberg, Lund (SE)

(73) Assignee: AXIS AB, Lund (SE)

( * ) Notice: Subject to any disclaimer, the term of this patent is extended or adjusted under 35 U.S.C. 154(b) by 385 days.

(21) Appl. No.: 17/957,775

(22) Filed: Sep. 30, 2022

(65) Prior Publication Data

US 2023/0114200 A1  Apr. 13, 2023

(30) Foreign Application Priority Data

Oct. 7, 2021 (EP) .................................. 21201417

(51) Int. Cl.
*H04L 9/40* (2022.01)
*G08B 13/196* (2006.01)

(52) U.S. Cl.
CPC .... *H04L 63/1466* (2013.01); *G08B 13/19634* (2013.01); *G08B 13/19667* (2013.01)

(58) Field of Classification Search
CPC ......... G06F 21/32; G06F 21/31; G06V 40/40; G06V 40/00; G06V 40/45
See application file for complete search history.

(56) References Cited

U.S. PATENT DOCUMENTS

| | | | |
|---|---|---|---|
| 10,817,722 B1 * | 10/2020 | Raguin | G06V 40/40 |
| 11,126,879 B1 * | 9/2021 | Vemulapalli | G06V 40/173 |
| 11,301,703 B2 * | 4/2022 | Lubin | G07C 9/37 |
| 11,430,103 B2 * | 8/2022 | Chen | G06T 7/13 |
| 2003/0123701 A1 | 7/2003 | Dorrell et al. | |
| 2004/0201751 A1 | 10/2004 | Bell et al. | |
| 2007/0253627 A1 * | 11/2007 | Islam | H04N 19/162 382/232 |
| 2013/0235072 A1 * | 9/2013 | Longhurst | H04N 1/644 345/605 |
| 2014/0015930 A1 * | 1/2014 | Sengupta | G06F 21/32 348/46 |
| 2014/0049653 A1 | 2/2014 | Leonard et al. | |
| 2016/0117544 A1 * | 4/2016 | Hoyos | G01B 11/22 348/78 |
| 2016/0342851 A1 * | 11/2016 | Holz | G06V 40/70 |
| 2017/0344793 A1 * | 11/2017 | Xue | G06V 40/18 |
| 2018/0012059 A1 * | 1/2018 | Gacon | G06V 40/193 |

(Continued)

FOREIGN PATENT DOCUMENTS

| | | | | |
|---|---|---|---|---|
| WO | 2016/207899 A1 | 12/2016 | | |
| WO | WO 2022006556 | * | 7/2021 | G06K 9/36 |

OTHER PUBLICATIONS

Extended European Search Report dated Apr. 4, 2022 for European Patent Application No. 21201417.9.

(Continued)

*Primary Examiner* — Tae K Kim
(74) *Attorney, Agent, or Firm* — Volpe Koenig (57) ABSTRACT

The present application relates to detecting if video images captured by a camera are depicting a live scene or a recorded video played on a monitor, display or computer screen, which is setup to hide the scene from the camera. Metadata regarding the mapping operation used to transform image data between different intensity ranges, or bit depths, is included with the video and evaluated in order to determine if a video replay attack has taken place.

15 Claims, 5 Drawing Sheets

(56) References Cited

U.S. PATENT DOCUMENTS

| | | | |
|---|---|---|---|
| 2018/0012094 A1 | 1/2018 | Wu et al. | |
| 2018/0239955 A1* | 8/2018 | Rodriguez | G06V 40/171 |
| 2018/0373958 A1* | 12/2018 | Patel | G06T 7/174 |
| 2019/0026544 A1* | 1/2019 | Hua | A61B 5/1128 |
| 2020/0342245 A1* | 10/2020 | Lubin | G06V 40/70 |
| 2021/0004952 A1* | 1/2021 | Chen | G06F 18/23 |
| 2021/0064901 A1* | 3/2021 | Vorobiev | G06V 40/45 |
| 2021/0082136 A1* | 3/2021 | Nikitidis | G06V 40/172 |
| 2021/0209387 A1* | 7/2021 | Nikitidis | G06V 10/764 |
| 2023/0091381 A1* | 3/2023 | Vemulapalli | G06N 20/00 |
| | | | 382/117 |
| 2023/0222842 A1* | 7/2023 | Hua | G06V 40/45 |
| | | | 382/181 |
| 2023/0252662 A1* | 8/2023 | Nikitidis | B29C 64/393 |
| | | | 382/103 |

OTHER PUBLICATIONS

T. Faseela, M. Jayasree, "Spoof Face Recognition in Video Using KSVM," Procedia Technology. 24. 1285-1291 (2016).

Raghavendra Ramachandra and Christoph Busch, "Presentation Attack Detection Methods for Face Recognition Systems—A Comprehensive Survey," ACM Computing Surveys (2017).

Pan et al. "Monocular camera-based face liveness detection by combining eyeblink and scene context." Telecommunication Systems 47, 215-225 (2011).

Ming et al., "A Survey on Anti-Spoofing Methods for Facial Recognition with RGB Cameras of Generic Consumer Devices," Journal of Imaging. 6. 139 (2020).

* cited by examiner

VIDEO REPLAY ATTACK DETECTION

FIELD OF INVENTION

The present disclosure relates to the field of video tampering detection. In particular, the application relates to detecting replay attacks when a video camera is capturing images of a display instead of a live scene.

TECHNICAL BACKGROUND

Video monitoring cameras are used in many different applications in today's society. Crime prevention, city surveillance, and traffic monitoring are just a few areas where the use of such cameras is prevalent. However, there is also an increasing risk of tampering attempts being aimed at such cameras, where various measures, from painting over the lens or unplugging the camera from a power supply or network connection, to more sophisticated methods including injection of fraudulent images into the video stream, are used to hide events in a monitored scene from being caught on camera. Various methods are employed to detect such tampering attempts, e.g., methods detecting unusually large objects or large dark image areas indicating that the camera lens has been covered by, e.g., paint, or methods for digitally signing video at the camera to prevent images from being replaced downstream of the camera.

A variant of tampering attempt which may be particularly difficult to detect is a so called video replay or spoofing attack, where a display screen is arranged in front of the video camera, where the display is playing video, e.g., showing the scene behind the display, but captured at another point in time. Such a video replay attack may be difficult to detect using the methods mentioned, since the scene looks correct to a viewer, and nothing has affected the captured video after capture that would impact a digital signature either. Thus, other methods are needed to be able to detect that a video depicts a replayed video on a display instead of a live scene.

US 2018/0012094 discusses a method of analyzing a magnitude of pixel saturation that indicates glare and reflection from the exterior surface of a display device in order to detect a spoofing attack in the context of face recognition.

T. Faseela, M. Jayasree, Spoof Face Recognition in Video Using KSVM, Procedia Technology, Volume 24, 2016, Pages 1285-1291, ISSN 2212-0173, (https://doi.org/10.1016/j.protcy.2016.05.118), lists a number of features that indicate that a video shows a display and not a real face, namely moire patterns, content independent noise, specular reflections, lack of color diversity, and defocused or blurred images. A support vector machine model is trained to predict if a video showing a face is genuine or spoof.

While some work certainly has been made in the area of video replay attack detection, especially in the context of face recognition, there is still room for improvement.

SUMMARY

An aim of the present disclosure is to provide a convenient method for detecting a video replay attack.

According to a first aspect, these and other objects are achieved, in full or at least in part, by a method according to claim 1.

Accordingly, a method of detecting a video replay attack where a camera captures images of video played on a display screen instead of a live scene comprises:

receiving image data at a first bit-depth, the image data having a first intensity range, mapping the image data, using a mapping operation, from the first bit-depth to a second, reduced bit-depth, to produce a representation of the image data having a second intensity range, generating metadata characterizing the mapping operation, associating the metadata with the representation of the image data, determining the first intensity range from the representation of the image data, determining the second intensity range from the representation of the image data, determining an expected mapping operation on basis of the second intensity range and the first intensity range, comparing the mapping operation and the expected mapping operation, determining that the image data results from a video replay attack if a measure of the difference between the mapping operation and the expected mapping operation exceeds a threshold level.

By including metadata characterizing the mapping operation with the representation of the image data, it is possible to utilize this knowledge regarding how the mapping from a higher to a lower bit depth is different in an image depicting a live scene than in an image depicting a display, at a receiver of the video. This provides a convenient way to determine if a video replay attack has taken place, or at least indicate that there is a risk that a camera has been filming a display and not a live scene, which in turn will increase the security of a camera monitoring system.

It may be noted that the term intensity range, in the context of the present disclosure, denotes the range of intensity levels that are accommodated at a certain bit depth. As an example, if the first bit depth is 12 bits, there are 4096 different intensity levels available in the first intensity range, and if the second bit depth is 8, the second intensity range has 256 different levels. Depending on the intensity dynamics, or the intensity (or color) diversity of the depicted scene, fewer or more of the available intensity levels will be populated. In case the camera is filming a video being played on a computer monitor or screen, there will be less diversity, due to the monitor showing a limited bit depth image, and, hence, fewer of the available intensity levels will be populated. In case the camera is filming a live scene, the diversity will be much larger, since an almost infinite number of different intensity levels are naturally present in a live scene. This will mean that many more of the available intensity levels will be populated.

The step of associating the metadata with the representation of the image data may be performed by encoding the metadata and the representation of the image data into an encoded video comprising one or more image frames. The metadata may be encoded in a header of one or more of the encoded images frames of the encoded video. This conveniently allows the metadata to be recorded together with the video data, so that it is accessible along with the video data.

The encoded video may be digitally signed, in order to improve the security and ensure that the video is less exposed to other tampering risks.

The step of comparing the mapping operations may comprise comparing a diversity measure of image pixel change amounts in the mapping operation. The diversity measure may be based on the number of uniquely different pixel change amounts in the mapping operation. This will give an indication of the intensity diversity in the captured image, which in turn indicates if a live scene or a video on a display is represented in the captured image data. Counting how many uniquely different pixel change amounts that occur will be a less complicated way of determining the intensity diversity than analyzing the different intensity values in themselves. This type of diversity measure will also be possible to use in different scenes, both light and dark, since it will not depend on the scene content, only on in how many different ways values are changed when they are mapped from the first intensity range to the second intensity range.

The representation of the image data may comprise information specifying the first intensity range. In this way the first intensity range will be easily retrievable when the expected mapping operation is determined. The information specifying the first intensity range may be stored in a header of an image, a header of a group of images, or a header of a video file. The first intensity range will commonly not vary between different video frames, and therefore this information conveniently can be stored in one or more of a multitude of locations, depending on the format of the images, e.g., based on which types of headers that are supported in an encoding standard that is used to encode images.

The first bit depth may be at least 10 bits, and the second, reduced bit depth may be at most 9 bits.

According to a second aspect, set forth herein is a computer readable storage medium having stored thereon instructions for implementing the above method.

According to a third aspect, set forth herein is a method of detecting a video replay attack, in accordance with claim 11.

According to a fourth aspect, set forth herein is a system according to claim 12.

According to a fifth aspect, set forth herein is a video client according to claim 15.

The above embodiments discussed in connection to the first aspect apply to the second and third aspect as well.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the system described or steps of the methods described as such system and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "a unit" or "the unit" may include several units, and the like. Furthermore, the word "comprising" does not exclude other elements or steps.

BRIEF DESCRIPTION OF THE DRAWINGS

The disclosure will now be described in more detail by way of example and with reference to the accompanying schematic drawings, in which.

DETAILED DESCRIPTION

Figure 1:
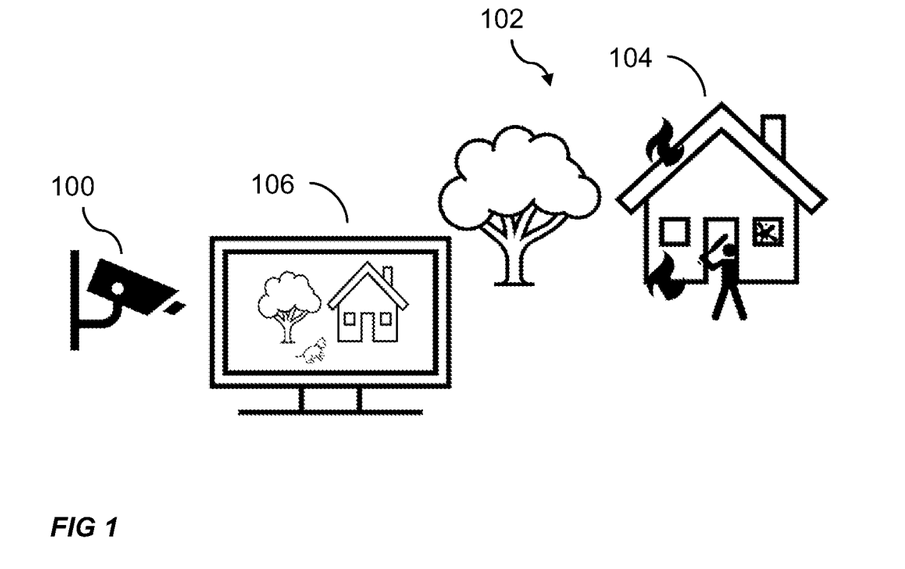
FIG. 1 illustrates a video replay attack.

FIG. 1 schematically illustrates a video replay attack situation. A camera 100 is mounted with the purpose of monitoring a scene 102, in this example the camera 100 is supposed to monitor a small house 104 and its closest surroundings.

Figure 2:
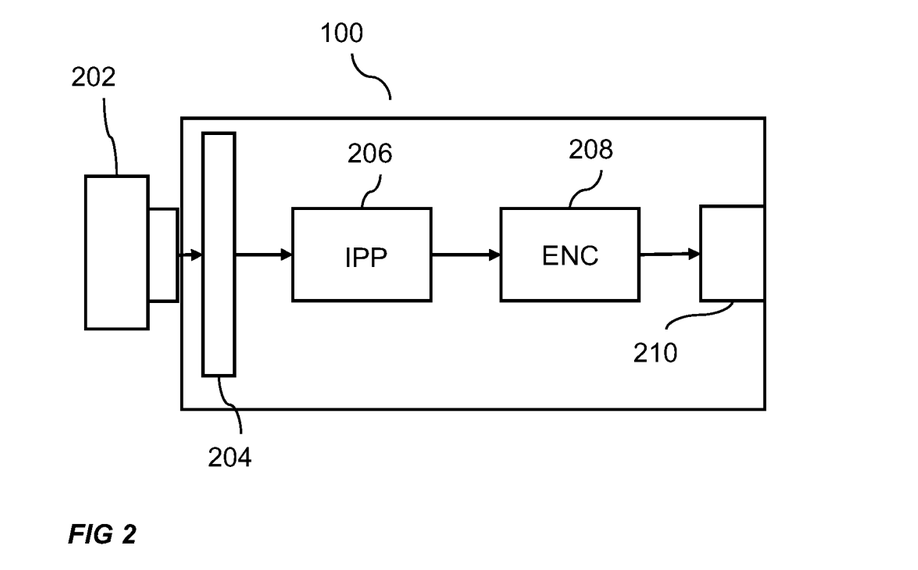
FIG. 2 illustrates a monitoring camera.

The camera 100 is shown in more detail in FIG. 2. The camera 100 captures images via a lens 202 and an image sensor 204. The images are fed to an image processing unit, or image processing pipeline, IPP, 206, and then to an encoder, 208. The camera has a transmitting function in the form of a network interface 210 which is used for transmitting encoded images from the camera 100. The camera may have several more components, but only the ones that are particularly relevant to the disclosure are illustrated.

In FIG. 1, a display 106 is placed in front of the camera 100, obscuring the scene 102 from the camera view. The display 106 is showing a previously captured video of the scene 102.

As illustrated in FIG. 1, the video playing on the display 106 shows the scene 102 during a period of time when no concerning activities are taking place. However, in the live scene 102, hidden behind the display 106, events are taking place which would be important to capture on camera. Thus, by playing a video showing the scene 102 at a previous, and uneventful, point in time on the display 106, and placing the display 106 in such a way that it hides the scene 102 from the camera 100, the camera 100 will capture a video which seems to show the live scene 102, but actually only shows the previously recorded video of the scene, played on the display 106. In this way it is possible to hide the dramatic events taking place in the scene 102 from a viewer of the video from the camera 100.

The camera 100 may have various tampering prevention measures in place, such as in the form of digital signatures of the video in the camera ensuring that the video is not replaced before viewing, or image analysis algorithms detecting obstructions or objects covering the lens. The live video from the camera 100 may also be streamed to a human viewer who checks it at least some of the time. However, none of these measures would detect the replay attack shown in FIG. 1, since the video being captured by the camera 100 does actually show the scene, only at a different time.

To be able to determine that the video captured by the camera 100 does not show the live scene 102 but instead depicts the display 106 which is playing a video of the scene 102, the inventors have realized that it is possible to utilize knowledge regarding how a live scene on one hand, and a depicted display on the other, impact the intensity dynamics of the captured video, and especially how such dynamics impact the conversion between different bit depths in the camera.

The bit depth, pixel depth, or color depth, is the number of bits used to define each image pixel, meaning that the greater the bit depth, the greater the number of tones, levels or shades, either grayscale or color, that can be represented. In other words, the bit depth determines the number of shades of gray, or the variation of colors that can be represented. A black and white image may have a single numerical value that represents the intensity or brightness in every single pixel of the image, and a color image may have three color values or channels in each pixel, each with a separate intensity value. In some cases the pixels in a color image may be represented by four different values, one for brightness/intensity and one for each of the colors red, green and blue. The bit depth conversion may also be denoted bit depth transformation, range compression or tone mapping.

The bit depth conversion from a higher bit depth, available at the image sensor, to a lower bit depth, used in the image processing in the camera is typically performed in order to adapt to the limitations of available processing power and memory in the camera.

As mentioned, the inventors have realized that the available intensity range of the captured video images is not utilized in the same way when depicting the display 106 as when depicting the live scene 102. The live scene 102 will have a much larger diversity than the display 106 playing a video of the scene 102, in terms of the number of different intensity levels (shades or tones) that are actually used or populated in the captured images. This difference stems from the fact that the display only shows a limited bit depth image, while the live scene naturally has an almost infinite number of different intensity levels.

When depicting the live scene, all intensity levels accommodated by the first bit depth could therefore potentially be populated. When depicting the display, on the other hand, a much smaller variety of intensity levels is represented in the captured image, since the display is only able to show a limited number of intensity levels. A typical display shows images at a bit depth of 8 bits, i.e., 256 steps or levels, meaning that no more than that number of different intensity levels will, at least in theory, be present in a captured image of the display. Shadows or light falling on the display may add more different intensity levels, but there will still be much fewer intensity levels than in a live scene.

When performing the mapping operation between the higher and the lower bit depth in the camera, the smaller variety of intensity levels will in turn reduce the diversity in the change amounts in the mapping operation of the pixel intensity values. Thus, the granularity or resolution of the pixel intensity change values of the bit depth mapping operation will be lower for an image depicting a display than for an image depicting a live scene. In other words, the number of uniquely different intensity value changes in pixels during the mapping operation will be lower for an image depicting a display than for an image depicting a live scene.

Figure 3:
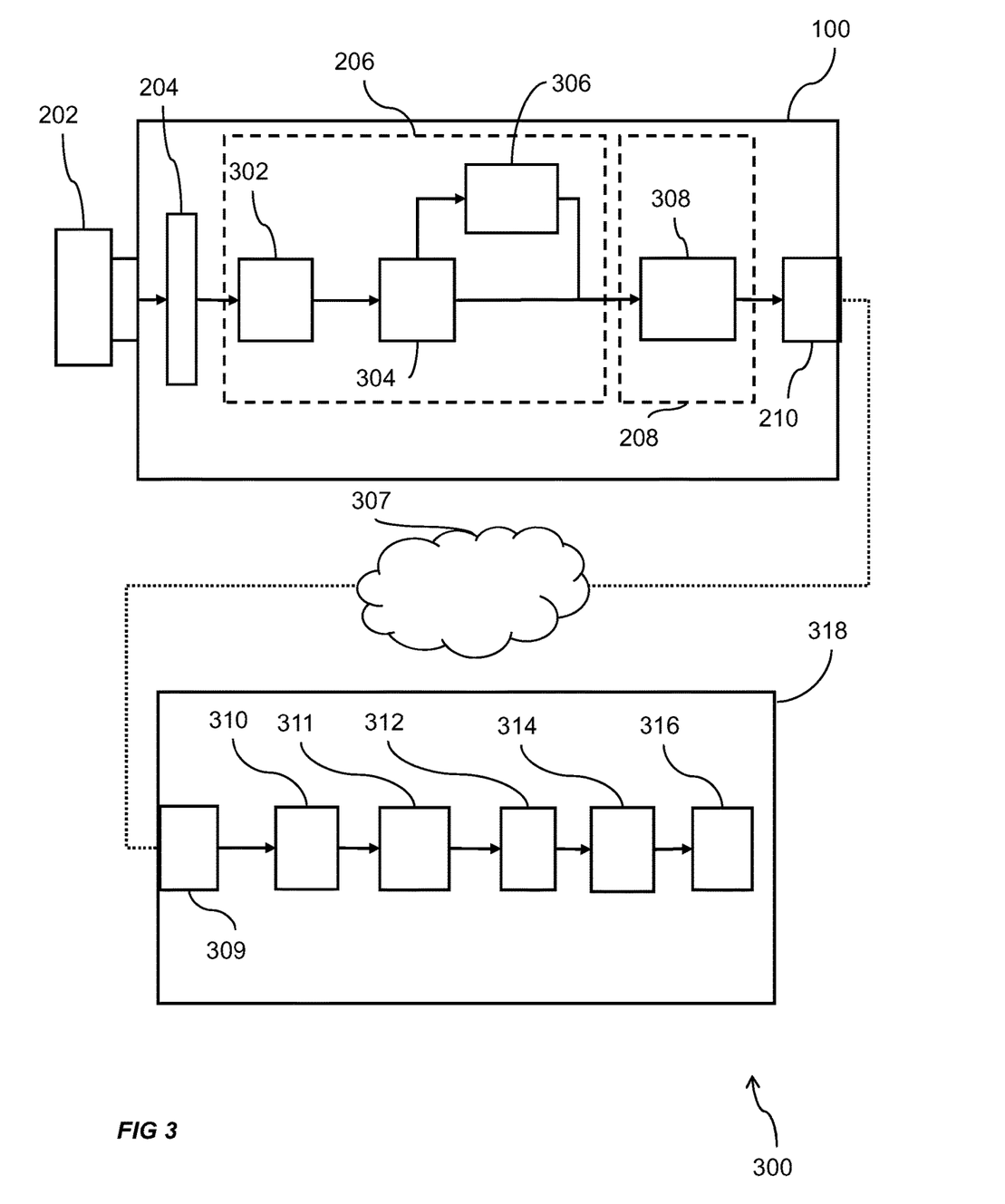
FIG. 3 illustrates a system for detecting a video replay attack.

To further explain the concept, FIG. 3 shows a system 300 for detecting a video replay attack. In the system 300, image data is received at a first receiving function 302. The image data is received from the image sensor 204, and, in today's monitoring cameras, commonly has a bit depth of 12-18 bits, but higher bit depths, such as 20 bits, or lower bit depths, such as 10 bits, may also be used in some circumstances.

In the present application, this bit depth of image data from the image sensor 204 is denoted first bit depth. The first bit depth accommodates a first intensity range when depicting a monitored area, such as the scene 102 or the display 106. As an example, if the bit depth is 12 bits, an intensity range of 4096 different levels is available.

However, the first bit depth is too large to be conveniently processed within a monitoring camera, due to memory and processing power constraints, and therefore the bit depth of the image data received from the image sensor needs to be converted, reduced, or mapped, to a second, lower bit depth, which is adapted for processing within a monitoring camera.

To this end, the received image data is fed, at the first bit depth, to a mapping function 304, which reduces the bit depth from the first bit depth to the second bit depth. This produces a representation of the image data which has a second intensity range with fewer different levels than the first intensity range. The second bit depth is adapted to the limitations of a typical image processing chip and would typically be 8, or in some cases 10, bits in today's monitoring cameras. 8 bits corresponds to an intensity range of 256 different intensity levels. It might be noted that the present disclosure will be useful in those cases where the first bit depth is larger than the second bit depth. In case the first and the second bit depth are the same, and no mapping will take place, the disclosure described herein would not be applicable.

Figure 4A:
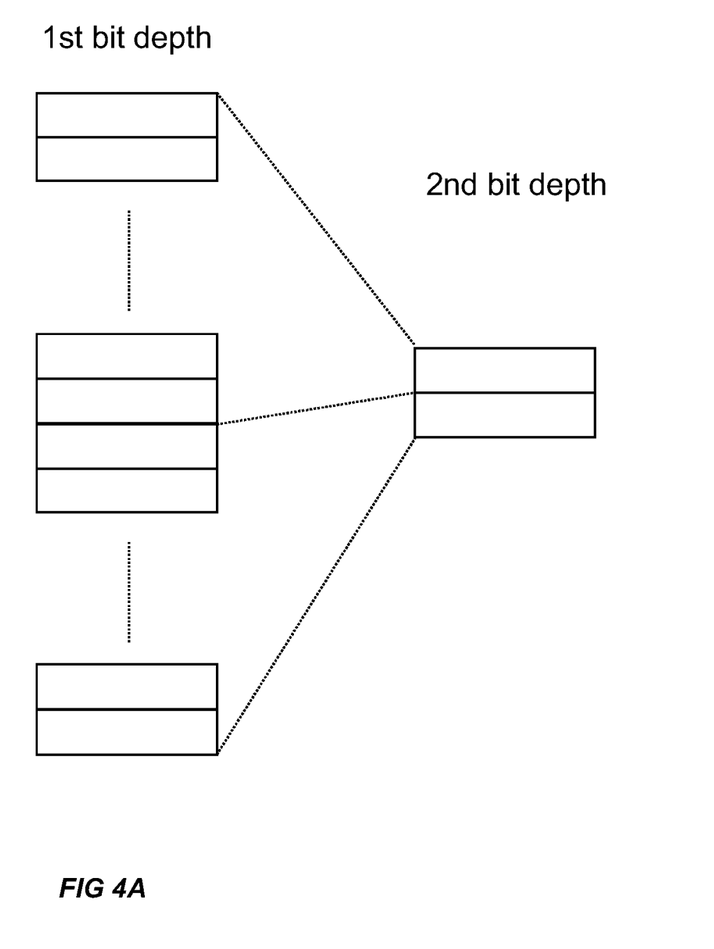
FIGS. 4A-4D illustrates transformations from a first bit depth to a second, reduced bit depth.

In the mapping operation, the intensity levels in the first bit depth are each mapped to a level in the second, reduced bit depth. A schematic illustration of a mapping operation is shown in FIG. 4A. Each level at the first bit depth will be mapped to a level at the second bit depth, in such a way that several levels at the first bit depth will be mapped, or combined, to one single level at the second bit depth.

In the example of a first bit depth of 12 bits, with a corresponding first intensity range of 4096 levels, and a second bit depth of 8 bits, with a corresponding second intensity range of 256 levels, each level in the second intensity range may then combine 16 levels in the first intensity range, in case a completely linear conversion is made. In other words, since the first bit depth is larger than the second, the transformation between the first bit depth and the second bit depth will be a many-to-one mapping where several intensity levels in the first intensity range are represented by one and the same intensity level in the second intensity range. It may be noted that the mapping is not necessarily linear in its nature, meaning that some parts of the first dynamic range may take up more of the second dynamic range, at the expense of other parts of the first dynamic range.

The bit depth reduction may be performed using a look up table, that models the relationship between the intensity levels in the first and the second bit depth. The bit depth reduction may also be modelled as a transfer function with a piece-wise linear transformation.

The bit depth reduction may also be performed utilizing a combination of methods, to allow an exposure algorithm in the camera to dynamically adjust the mapping operation, i.e., to adjust the mapping operation in real time. The exposure algorithm will then use the intensity values of different regions of the captured video images to adjust how the mapping operation transforms the intensity values of the image between the first bit depth and the second bit depth. The exposure algorithm will in that scenario, among other things, evaluate a histogram of intensities of the captured video image, and use this to adapt the mapping operation to local intensity differences in the video image, i.e., the mapping operation will be different in different parts of the video image. This local contrast function will improve the preservation of details when different regions of the image have different local light intensities.

Returning to the concept, the mapping operation will therefore include changing the intensity value of most pixels in each image when transforming their individual intensity values from the first intensity range to the second intensity range, as long as the image is depicting a live scene. Since any live scene will have an almost infinite number of different intensity levels, it is likely that the change in pixel intensity value will be different between different pixels and that few pixels will change their value with the same amount during the mapping operation.

However, when an image depicts a video played on a display, much fewer intensity levels will be represented in the image, due to the limited dynamic range of the display. Therefore, in such a situation, more pixels will experience a similar, maybe even equal, change in pixel value, when mapped from the first to the second intensity range. Thus, the diversity of change amounts in pixel intensity values will be much smaller in a mapping operation for an image depicting a display than for an image depicting a live scene.

Figure 4B:
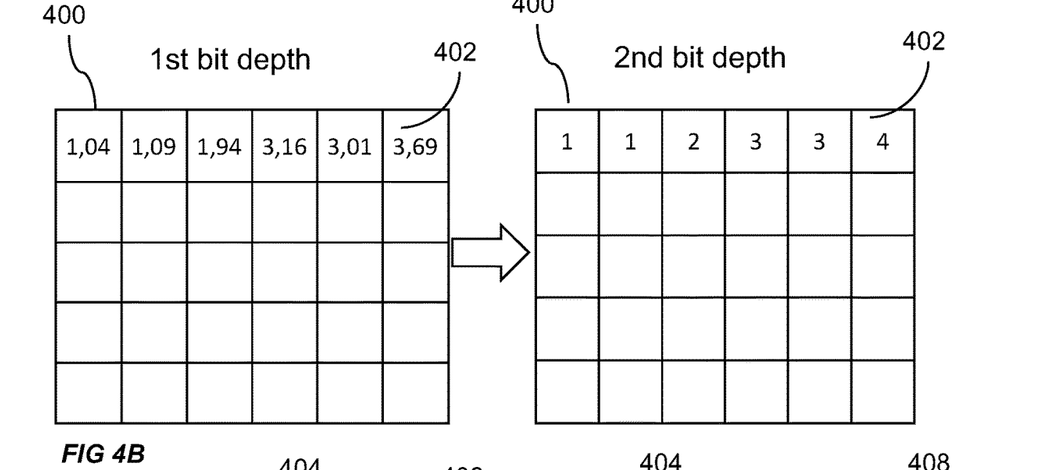
Figure 4C:
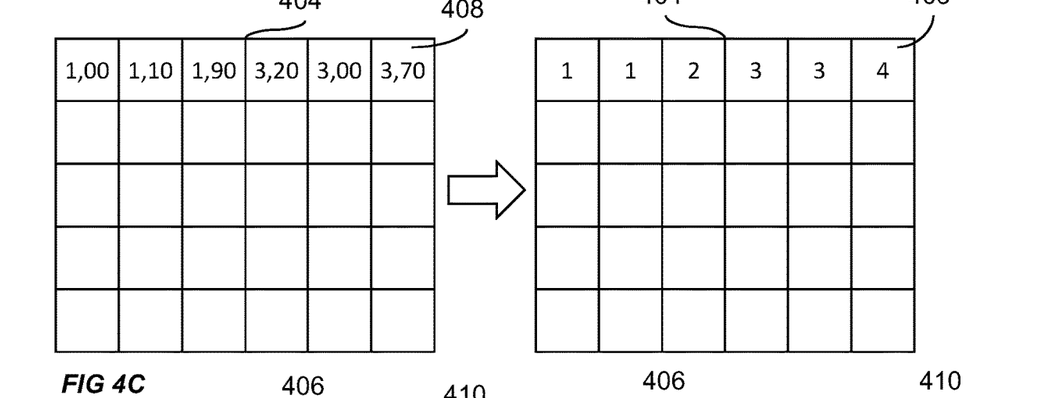
Figure 4D:
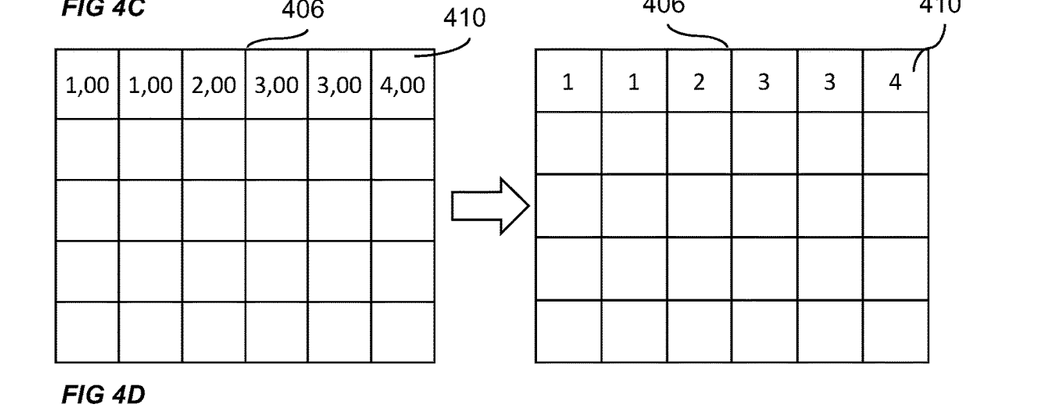

This is illustrated in FIGS. 4B-4D. In FIG. 4B, an image 400, consisting of pixels 402 is illustrated. Each pixel has a pixel intensity value within the first intensity range, which is represented in a first bit depth to the left. After the mapping operation from the first bit depth to the second, reduced bit depth, each pixel has a new intensity value, represented in the second bit depth, to the right in the figure. In FIG. 4B, the image is of a live scene, and there is a high diversity among the intensity values, meaning that few, if any, pixels have the exact same intensity. From this follows that the change amounts of the pixels vary from pixel to pixel when the pixel intensity values are converted from the first bit depth to the second bit depth in the mapping operation.

In FIGS. 4C and 4D, image 404, 406 with pixels 408, 410, are instead showing a display replaying a video of the scene, and since the display has a lower bit depth, there are fewer different intensity values in the image when represented in the first bit depth (in the left part of the figures). In FIGS. 4B and 4C, this is illustrated by there being fewer decimal places populated in the intensity values, but this is obviously a simplified way of explaining the concept, and many different options are available for representing the intensity values in the different bit depths.

In FIG. 4D, the image depicts a display showing the replay video and having a bit depth equal to the second bit depth, meaning that, at least in theory, no combining of intensity values is done, since each intensity value in the display will have a corresponding value available in the second intensity range.

Returning to FIG. 3, information detailing the mapping operation, i.e., the changes in the pixel intensity values, is received from the mapping function 304 by a metadata generation function 306, and metadata characterizing the mapping operation that is used to reduce the bit depth from the first bit depth to the second, reduced bit depth is generated. The metadata may be in the form of a numeric value, indicating how much diversity or variability that is present in the change amount of individual pixel intensity values when mapped from the first intensity range to the second intensity range. As an example, the number of different intensity value changes may be used. Other statistical measures of the diversity, granularity, resolution, or variability of the change amounts of individual pixel intensity values may also or alternatively be included in the metadata.

As another option, all values of the different intensity value changes may be included in the metadata, e.g., in the form of a list, table, or vector of values or in the form of data forming a histogram. In case the camera is using a mapping operation which is different in different regions of the image, additional information on the mapping operation may also be included. The metadata can be grouped based on a division of the image into different areas. The areas may be in the form of a fix sparse grid or based on the image content, e.g., sky, ground, main object, background, foreground, detected moving objects such as cars or people.

The generated metadata is then fed from the metadata generation function 306, in addition to the representation of the image data, at the second, reduced bit depth, from the mapping function 304, to a metadata association function 308 which is arranged to associate or connect the metadata to the representation of the image data. This association of metadata and the representation of the image data could be as straight-forward as the metadata being stored in a header of image frames constituting the representation of the image data. The metadata may, e.g., be stored in a supplemental enhancement information, SEI, header of the encoded image frames.

The functions 302, 304, 306 and 308, are typically provided in the camera 100, and, more specifically, the first receiving function 302, the mapping function 304 and the metadata generation function 306 are typically implemented as part of the IPP 206, and the metadata association function 308 is typically implemented as part of the encoder 208.

In this context it may be noted that the encoder may also add information specifying the first bit depth, i.e., the bit depth of the image sensor capturing the image. This information may be added to each image or it may be added to a header or other metadata container that is associated with a group of images, or a video file comprising the images. In that way the information on the first bit depth, and therefore the first intensity range, will be available with the representation of the image data. The information may be in the form of a numeric value specifying the bit depth at the image sensor, e.g., 12 according to the example mentioned above. The information may additionally or alternatively include a specification of the number of different intensity levels available, i.e., 4096, in the example of a bit depth of 12 bits.

In addition, an indication of the second bit depth is normally added to the images, e.g., in the header or other metadata container of each image, group of images or video file. This may also be in the form of a numeric value, e.g., 8, or 256, for the example of a second bit depth of 8 bits accommodating 256 different intensity levels.

The representation of the image data, with the associated metadata, is then transmitted, typically in the form of a stream of encoded video images, by the network interface 210, e.g., as indicated in FIG. 3, via a network 307, to a video client 318, which receives the representation of the image data and the associated metadata via a second receiving function 309. In the video client 318, a first intensity range determination function 310 is configured to determine the first intensity range, based on the representation of the image data. This may be as simple as retrieving an indication of the image sensor bit depth embedded within a header of the image, or a header of a group of images, or a video file including the image.

Another option may be to determine the first bit depth from information regarding the camera capturing the video, e.g., by including info on the camera make and model with the representation of the image data, and then consulting a database to find information on the bit depth associated with the image sensor of that camera. In some circumstances, when the information on the sensor bit depth is lost or missing, a default value for the sensor bit depth, i.e., the first bit depth, might be used, such as 12 bits or 14 bits.

As discussed previously, the first intensity range is the number of intensity values available at the first bit depth.

A second intensity range determination function 311 is configured to determine the second intensity range from the representation of the image data. The bit depth of an image is typically available from standard image metadata, stored in each image header, and therefore this determination is typically performed by retrieving this bit depth information. The second intensity range is the number of intensity values available at this bit depth, i.e., the second bit depth.

The first intensity range is then used together with the second intensity range, by an expected mapping operation determination function 312, to determine an expected mapping operation for the depicted scene, i.e., for a live scene corresponding to the captured images.

The expected mapping operation, or numeric value(s) characterizing the mapping operation, may be determined by a machine learning algorithm, e.g., a convolutional neural network, which has been pre-trained on annotated image data including different combinations of first bit depth, second bit depth and resulting mapping operation characterizing numeric value, e.g., in the form of the number of different pixel value intensity changes. Such a neural network-based approach may also take different types of scenes into account, and be trained to differentiate between scenes with different dynamic content.

Another, more simplistic option may be to use a look-up table of typical values when mapping from a specific first bit depth to a specific second bit depth, where the look-up table would list different mapping operation characteristic values for different combinations of first bit depth and second bit depth. The look-up table may be filled in manually by a person by testing different combinations and selecting a typical value or value interval for each type of mapping operation.

A simple example for how to determine an expected mapping operation is as follows. If the first intensity range comprises 4096 different values, i.e., the first bit depth is 12 bits, the second intensity range comprises 256 different values, and a linear mapping is done, i.e., the same amount of values represented in the first intensity range is mapped to a single value in the second intensity range for all values in the second intensity range, then the maximum number of different pixel amount change values is 16, since 16 different values in the first intensity range are mapped to every single value in the second intensity range. Thus, the number characterizing the mapping operation is 16 in this example, since there would be 16 different ways that any pixel value could change in the mapping operation.

Both the training of the machine learning algorithm and the look-up table may in addition have different entries for different types of images, e.g., for dark or bright images (measured, e.g., by min-max range of the intensity or other characteristic value specifying the overall image brightness), or for images captured in different environments, such as indoors or outdoors, which may affect the intensity values. The selection of the expected mapping operation may then be guided by additional metadata included with the representation of the image data, or by information available in the video client regarding the camera, such as indoors or outdoors placement or the time of day.

The expected mapping operation may be characterized by one or more numeric values that can be compared to the same kind of numeric values that characterize the (actual) mapping operation and which are retrieved from the metadata of the image. To this end, a mapping comparison function 314 is provided. The comparison between the actual mapping operation and the expected mapping operation may be performed by comparing an absolute value of a difference between the characterizing numeric values to a predetermined threshold value. In the example above, this would entail comparing the number 16 to a number of different pixel changes stored in the metadata characterizing the mapping operation, and comparing the absolute difference to a threshold value.

It may be noted that in case the metadata characterizing the mapping operation comprises all pixel change values, a first calculation would typically need to be made to provide one or more numeric values that can be compared to the corresponding numeric values of the expected mapping operation.

Finally, a video replay attack determination function 316 makes a determination on whether the measure of the difference between the expected mapping function and the actual mapping function is larger than the threshold value, which indicates that a video replay attack has taken place, and that the video may not show the scene 102 at the time the video was captured.

In other words, in case the absolute value of the difference is larger than the threshold value, it is determined that the image to which the mapping operation is associated is likely depicting a video replay attack.

As already mentioned, the functions 310, 312, 314 and 316 are advantageously implemented in a video client, where video from the camera 100 can be received and reviewed by a user. The video client may be implemented as a part of a video management system. Using the inventive concept, as presented herein, the video client will be able to indicate to a user if it is likely that a video replay attack has taken place at the camera 100. The indication may, e.g., be provided in a user interface or as a message sent to a pre-defined recipient. The indication may also be logged as an event within the video management system.

The determination of whether a video replay attack has taken place (or is likely to have taken place) may be performed on every image, or it may be performed on images with a certain interval between them. By only checking images at certain intervals, processing power may be spared at the video client. Measures may also be implemented where the result of several images are taken into account, e.g., the result of several consecutive images in a stream of images depicting the scene. The determination that a video replay attack is likely to have taken place might be made only if several images in a row indicate this. This measure may improve the reliability of the system.

Figure 5:
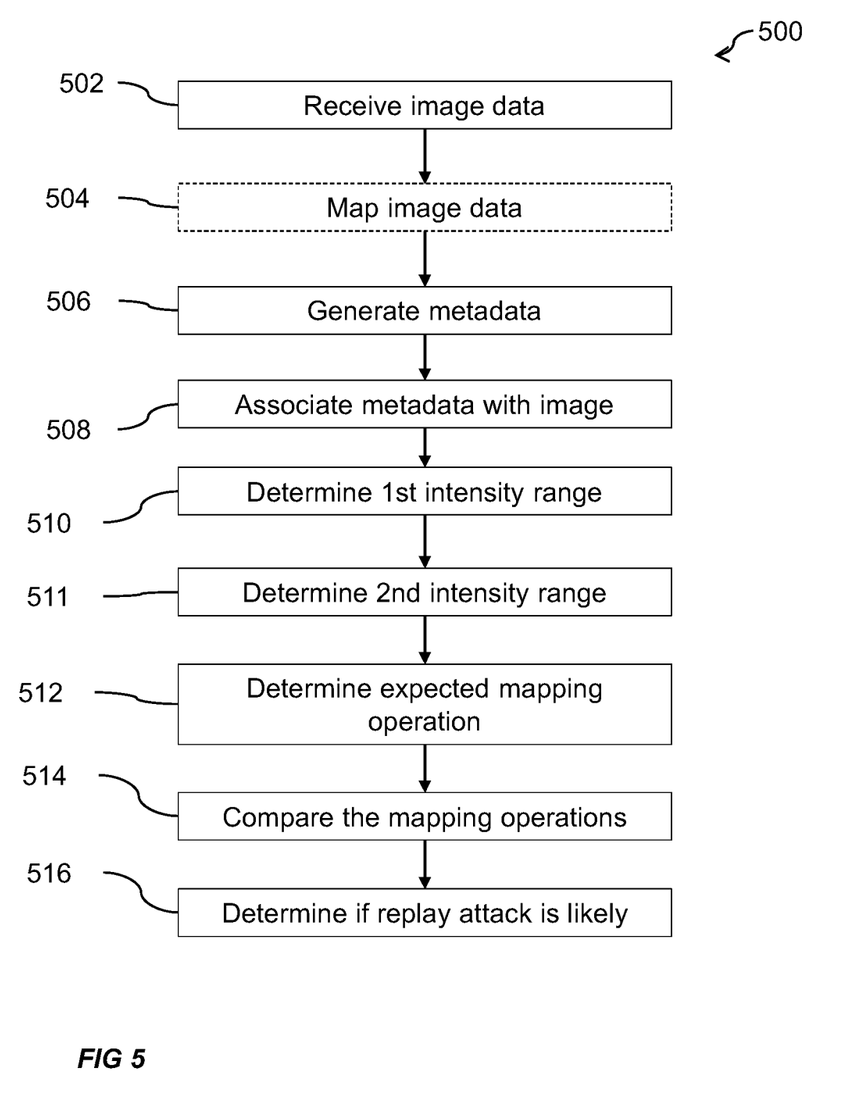
FIG. 5 is a flow chart illustrating a method of detecting a video replay attack.

In FIG. 5, a method 500 of detecting a video replay attack is illustrated. In step 502 image data is received at a first bit depth and having a first intensity range. In step 504 this image data is mapped, using a mapping operation, from the first bit depth, to a second, reduced bit depth, in order to produce a representation of the image data which has a second intensity range.

In step 506 metadata which characterizes this mapping operation is produced, and in step 508 this metadata is associated with the representation of the image data. As mentioned, this association may be done by placing the metadata in an image header, typically when encoding the representation of the image data.

In next step 510, the first intensity range is determined based on the representation of the image data, and in step 511 the second intensity range is determined. These two, as well as the following steps, typically take place outside the camera, such as at a video client.

Based on the determined first intensity range and second intensity range, an expected mapping operation is determined in step 512. The expected mapping operation and the (actual) mapping operation are then compared in step 514, and, finally, in step 516 it is determined if the images are most likely to depict a live scene or a display, i.e., if a replay attack is likely to have happened.

In summary, the present concepts relate to detecting if video images captured by a camera are depicting a live scene or a recorded video played on a monitor, display or computer screen, which is setup to hide the scene from the camera. Metadata regarding the mapping operation used to transform image data between different intensity ranges, or bit depths, is included with the video and evaluated in order to determine if a video replay attack has taken place.

The person skilled in the art realizes that the present disclosure by no means is limited to the preferred embodiments described above. On the contrary, many modifications and variations are possible within the scope of the appended claims. For example, in order to simplify the description, the discussion herein has mostly referred to intensity levels, i.e., brightness or luminosity, but the inventive concepts could also be extended to use several color channels. If more than one color channel were to be utilized, the metadata could comprise a combined or aggregated value characterizing the mapping operations on all the color channels, e.g., an average value or a median value, from all color channels, or the metadata could comprise several values, such as one from each color channel.

It may be noted that even though the description herein is mainly describing how a camera generates the representation of the image data and transmits it with the associated metadata to a video client, the inventive method may also be used within one and the same device, i.e., with no transmission between two devices taking place. In other words, all parts of the system may be present in one and the same device, typically a camera or other video source.

The invention claimed is:

1. A method of detecting a video replay attack where a camera captures images of video played on a display screen instead of a live scene, the method comprising:
   receiving image data at a first bit-depth, the image data having a first intensity range;
   mapping the image data, using a mapping operation, from the first bit-depth to a second, reduced bit-depth, to produce a representation of the image data having a second intensity range;
   generating metadata characterizing the mapping operation;
   associating the metadata with the representation of the image data;
   determining the first intensity range from the representation of the image data;
   determining the second intensity range from the representation of the image data;
   determining an expected mapping operation on basis of the second intensity range and the first intensity range;
   comparing the mapping operation and the expected mapping operation; and
   determining that the image data results from a video replay attack if a measure of the difference between the mapping operation and the expected mapping operation exceeds a threshold level.

2. The method of claim 1, wherein associating the metadata with the representation of the image data is performed by encoding the metadata and the representation of the image data into an encoded video comprising one or more image frames.

3. The method of claim 2, wherein the metadata is encoded in a header of one or more encoded image frames in the encoded video.

4. The method of claim 2, further comprising digitally signing the encoded video.

5. The method of claim 1, where the step of comparing the mapping operations comprises comparing a diversity measure of image pixel change amounts in the mapping operation.

6. The method of claim 5, wherein the diversity measure is based on the number of uniquely different pixel change amounts in the mapping operation.

7. The method of claim 1, wherein the representation of the image data comprises information specifying the first intensity range.

8. The method of claim 7, wherein the information specifying the first intensity range is stored in a header of an image, a header of a group of images or a header of a video file.

9. The method of claim 1, wherein the first bit-depth is at least 10, and the second, reduced bit-depth is at most 9.

10. A non-transitory computer readable storage medium having stored thereon instructions for implementing a method for detecting a video replay attack, when executed on a device having processing capabilities, the method comprising:
   receiving image data at a first bit-depth, the image data having a first intensity range;
   mapping the image data, using a mapping operation, from the first bit-depth to a second, reduced bit-depth, to produce a representation of the image data having a second intensity range;
   generating metadata characterizing the mapping operation;
   associating the metadata with the representation of the image data;
   determining the first intensity range from the representation of the image data;
   determining the second intensity range from the representation of the image data;
   determining an expected mapping operation on basis of the second intensity range and the first intensity range;
   comparing the mapping operation and the expected mapping operation; and
   determining that the image data results from a video replay attack if a measure of the difference between the mapping operation and the expected mapping operation exceeds a threshold level.

11. A method of detecting a video replay attack where a camera is capturing images of video played on a display screen instead of a live scene, the method comprising:
   receiving a representation of image data having a second intensity range, and metadata characterizing a mapping operation that was used to map the image data having a first intensity range from a first bit-depth to a second, reduced bit-depth, thereby generating the representation of image data having the second intensity range;
   determining the first intensity range from the representation of the image data;
   determining the second intensity range from the representation of the image data;
   determining an expected mapping operation on basis of the second intensity range and the first intensity range;
   comparing the mapping operation and the expected mapping operation; and
   determining that the image data results from a video replay attack if a measure of the difference between the mapping operation and the expected mapping operation exceeds a threshold level.

12. A system for detecting a video replay attack where a camera is capturing images of video played on a display screen instead of a live scene, the system comprising:
    a memory;
    a processor, coupled to the memory, configured to:
    receive image data at a first bit-depth, the image data having a first intensity range;
    map the image data, using a mapping operation, from the first bit-depth to a second, reduced bit-depth, to produce a representation of the image data having a second intensity range;
    generate metadata characterizing the mapping operation;
    associate the metadata with the representation of the image data;
    determine the first intensity range from the representation of the image data;
    determine the second intensity range from the representation of the image data;
    determine an expected mapping operation on basis of the second intensity range and the first intensity range;
    compare the mapping operation and the expected mapping operation; and
    determine that the image data results from a video replay attack if a measure of the difference between the mapping operation and the expected mapping operation exceeds a threshold level.

13. The system of claim 12, wherein the association of the metadata with the representation of the image data is performed by encoding the metadata and the representation of the image data into an encoded video comprising one or more image frames.

14. The system of claim 12, wherein the processor is further configured to transmit video to a client.

15. A video client configured for detecting a video replay attack where a camera is capturing images of video played on a display screen instead of a live scene, the client comprising:
    a memory;
    a processor, coupled to the memory, configured to:
    receive a representation of image data having a second intensity range and metadata characterizing a mapping operation that was used to map the image data having a first intensity range from a first bit-depth to a second, reduced bit-depth, thereby generating the representation of image data having the second intensity range;
    determine the first intensity range from the representation of the image data;
    determine the second intensity range from the representation of the image data;
    determine an expected mapping operation on basis of the second intensity range and the first intensity range;
    compare the mapping operation and the expected mapping operation; and
    determine that the image data results from a video replay attack if a measure of the difference between the mapping operation and the expected mapping operation exceeds a threshold level.

* * * * *